March 22, 1938. E. C. HATCHER 2,112,157
MEANS FOR TENSIONING DRIVING BELTS, CHAINS, AND THE LIKE
Filed Feb. 25, 1936
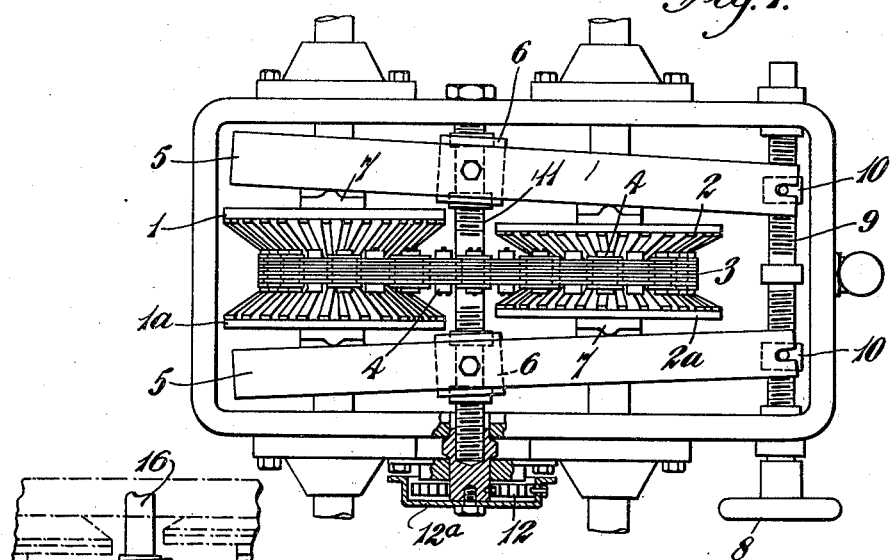
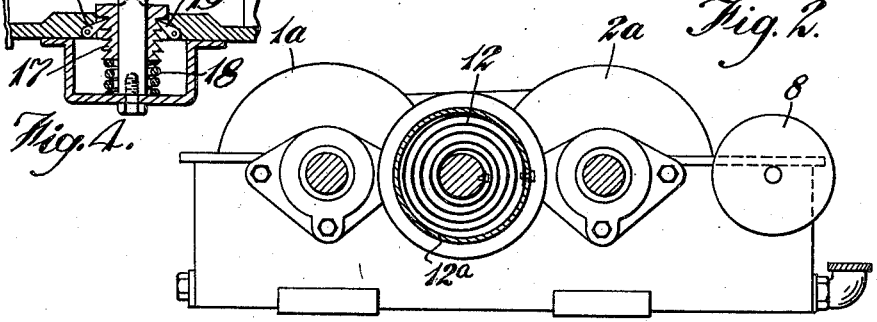
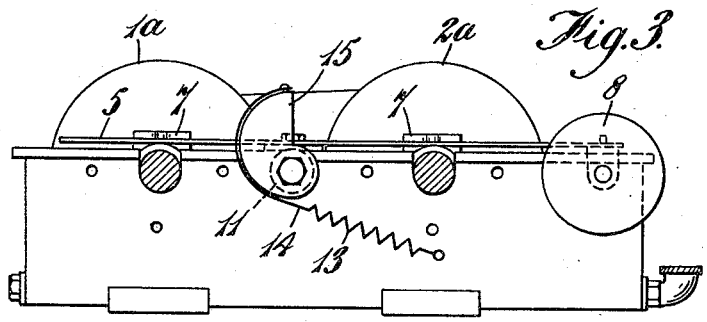
INVENTOR
ERNEST C. HATCHER
By Norris & Bateman
ATTORNEYS Patented Mar. 22, 1938

2,112,157

UNITED STATES PATENT OFFICE 2,112,157

MEANS FOR TENSIONING DRIVING BELTS, CHAINS, AND THE LIKE

Ernest Charles Hatcher, Northwood, England

Application February 25, 1936, Serial No. 65,703
In Great Britain February 7, 1935

9 Claims. (Cl. 74—230.17)

This invention relates to means for tensioning driving belts, chains and the like. The said invention provides means for automatically adjusting the position of a member acting to vary the tension of the belt or chain travelling in contact therewith. The said automatic adjustment means can also be conveniently employed in combination with variable velocity ratio gearing of the type comprising conical pulleys or toothed bevel wheels, such as belt or chain driving gearing comprising two pairs of bevel or conical toothed wheels, wherein the members of each pair are mounted coaxially and are relatively movable closer together or further apart so as to vary, at any given radius, the width of the substantially V-shaped groove or annular space between the wheels which have their operative faces, on which the belt or chain travels, divergent in a direction extending away from the common axis of the wheels.

The said invention provides a device which is operated by slackening of the belt or chain. For this purpose means are provided acting continuously on the said fulcra, to move the same, the arrangement being such that movement takes place only in the direction effective for tightening the chain or belt and movement in a direction to allow the chain or belt to become slack cannot occur. Such a device may comprise a screw urged to rotate in one direction by a spring, the screw acting through a nut, held against rotation, to move a belt tightening member, the engagement of the nut with the screw threads preventing the nut from moving back after it has been advanced by the screw. In another arrangement the belt tightening member is moved by a slider acted upon by a spring and prevented from moving against the action of the spring by a ratchet and pawl.

In the normal operation of the belt or chain, for example, when starting or stopping, the tension of parts of the belt varies and if the belt or chain becomes sufficiently slack the spring above mentioned can then actuate the belt tightening means.

In the accompanying drawing:

Figure 1 is a plan view of variable velocity ratio gearing comprising a belt or chain having this invention applied thereto.

Figure 2 is a side view of the arrangement shown in Figure 1.

Figure 3 is a view similar to Figure 2 illustrating a modified arrangement.

Figure 4 is a partial plan view of a further modification.

As shown in Figures 1 and 2, 1, 1a are conical toothed wheels movable axially relatively to vary the width of the groove or space between them and 2, 2a are similarly arranged wheels, a driving connection between the respective pairs of wheels being provided for by a chain 3 with laterally projecting members 4 which engage the teeth of the wheels. The chain 3 can be caused to travel on parts of the wheels at different radial distances thereon, by varying the axial distances between the wheels of each pair, by means of levers 5 pivotally mounted on blocks 6 and pressing against collars 7 in contact with the hubs of the said wheels. The axial distance between one pair of wheels can be increased whilst the axial distance between the other pair of wheels is diminished by rocking the levers 5 by means of a hand wheel 8 on a right and left hand screw 9 carrying nuts 10 engaging the ends of the levers 5.

Simultaneous reduction or increase of the axial distance between both pairs of wheels can be effected by moving the blocks 6 closer together or further apart. To allow this to be done the blocks 6 are mounted on a rotary spindle 11 with right and left hand screw-threads engaging in correspondingly screw-threaded holes in the said blocks. An effort tending to rotate the spindle 11 is applied thereto by a spring 12 so that both wheels are constantly urged as close together as the width of the chain 3 permits, the said spring being secured at one end to the spindle 11 and at the other end to a cap 12a, the latter being held against movement in any suitable manner, as for instance by means of a lug carried by a frame part and engaging a notch in the flange of cap 12a. On the chain becoming slack the wheels will be moved through the action of the spring 12 so as to force the chain on to parts of the wheels of greater radius and thus take up any slackness. Both reaches of the chain are thus kept in tension.

After the blocks 6 have been moved closer together to take up slackness of the chain, on the chain again becoming taut the blocks cannot be forced further apart as axial movement of these blocks is prevented by their screw-threaded engagement with the spindle 11.

Figure 3 shows a side view of an arrangement similar to that shown in Figure 1 in which however the spring 12 is replaced by a spring 13 which acts on the screw threaded spindle 11 on which blocks 6 are mounted, through a cord or chain 14 wrapped about and secured at one end to a cam or fusee 15 keyed on the spindle 11 and designed to increase the leverage with which the pull of the spring 13 acts on the cord or chain 14 as the tension of the spring decreases on rotation of the spindle 11. In this case also, if the chain 3 becomes slack, the pairs of wheels can be moved closer together until their approach one towards the other is arrested by the lateral edges of the chain 3. This movement to tighten the chain is effected by rotation of the spindle 11 constantly urged by the spring 13 to rotate so as to bring the blocks 6 closer together.

Another arrangement wherein a belt or chain can be tightened by a movable member constantly urged in one direction by a spring and prevented from moving back against the action of a spring, applied to a gearing such as is shown in Figure 1, is shown in Figure 4, wherein the block 16a is slidable on a bar 16 carrying a sleeve 17 acted upon by a spring 18 pressing the sleeve against the block. Return movement of the block is prevented by pawls 19 engaging ratchet teeth on the sleeve.

I claim:

1. Means for tensioning a driving belt transmitting motion from one pair of conical toothed wheels to another pair of conical toothed wheels, comprising a screw-threaded spindle, screw-threaded fulcrum blocks mounted on such spindle, levers pivotally mounted in such fulcrum blocks to move the wheels of each pair axially relatively to each other, and resilient means continuously exerting a turning moment upon said spindle to move the wheels axially towards each other to tension the driving belt.

2. Means for tensioning a driving belt transmitting motion from one pair of conical toothed wheels to another pair of conical toothed wheels, comprising a screw-threaded spindle, screw-threaded fulcrum blocks mounted on such spindle, levers pivotally mounted in such fulcrum blocks to move the wheels of each pair axially relatively to each other, and resilient means continuously exerting a turning moment upon said spindle in one direction only.

3. Means for tensioning a driving belt transmitting motion from one pair of conical toothed wheels to another pair of conical toothed wheels, comprising a screw-threaded spindle, screw-threaded fulcrum blocks mounted on such spindle, levers pivotally mounted in such fulcrum blocks to move the wheels of each pair axially relatively to each other, a cam keyed to the spindle, and a spring acting upon the cam and exerting a continuous turning moment thereon.

4. Means for tensioning a driving belt transmitting motion from one pair of conical toothed wheels to another pair of conical toothed wheels, comprising a screw-threaded spindle, screw-threaded fulcrum blocks mounted on such spindle, levers pivotally mounted in such fulcrum blocks to move the wheels of each pair axially relatively to each other, a cam keyed on the spindle, a tension spring and a flexible element secured at one end to the spring and at the other end to the cam.

5. Means for tensioning a driving belt transmitting motion from one pair of conical toothed wheels to another pair of conical toothed wheels, a spindle extending between the pairs of wheels and parallel with the axes thereof, fulcrum blocks mounted on said spindle, levers pivotally mounted in the fulcrum blocks, and mechanism, including resilient means, for constantly urging the blocks toward each other, said mechanism designed to prevent return movement of the blocks.

6. Means for tensioning a driving belt transmitting motion from one pair of conical toothed wheels to another pair of conical toothed wheels comprising a spindle, blocks movable axially on the spindle, levers pivotally mounted on the said blocks to press against wheels of each pair respectively, and mechanism for constantly urging said blocks nearer together and preventing retrograde movement thereof, said mechanism including resilient means as a source of urging force and also including means to prevent said resilient means from being overcome in a direction counter to said urging means.

7. Means for tensioning a driving belt transmitting motion from one pair of conical toothed wheels to another pair of conical toothed wheels comprising a spindle, blocks movable axially on the spindle, levers pivotally mounted on the said blocks to press against wheels of each pair on opposite sides of the pivotal support of the lever, mechanism including spring means operating to urge the said blocks nearer together, means for manually rocking the said levers about their pivotal supports on the blocks, and means for preventing retrograde movement of the blocks.

8. Mechanism for tensioning a driving belt transmitting motion from one pair of conical toothed wheels to another pair of conical toothed wheels, comprising a lever, a fulcrum block in which the said lever is pivotally mounted, means constantly exerting a thrust on the said block in one direction only to press the lever simultaneously against one wheel of each of the said pairs of wheels, said means designed to prevent appreciable retrograde movement of the block.

9. Mechanism for tensioning a driving belt transmitting motion from one pair of conical toothed wheels to another pair of conical toothed wheels, comprising a spindle, a fulcrum block adjustable axially on the spindle, a lever pivotally mounted in the said block and spring actuated means engaging the said block to press the lever thereon against one wheel of each of the said pairs of wheels and means to prevent retrograde movement of the said block.

ERNEST CHARLES HATCHER.